US007330823B1

(12) United States Patent
DeRosier et al.

(10) Patent No.: US 7,330,823 B1
(45) Date of Patent: Feb. 12, 2008

(54) SYSTEM AND METHOD FOR PERFORMING SOCIOMETRIC DATA COLLECTION AND ANALYSIS FOR THE SOCIOMETRIC CLASSIFICATION OF SCHOOLCHILDREN

(76) Inventors: Melissa E. DeRosier, 407 Evert Dr., Cary, NC (US) 27511; Jim Thomas, 407 Evert Dr., Cary, NC (US) 27511

( * ) Notice: Subject to any disclaimer, the term of this patent is extended or adjusted under 35 U.S.C. 154(b) by 950 days.

(21) Appl. No.: 09/945,096

(22) Filed: Aug. 31, 2001

(51) Int. Cl.
*G06F 17/30* (2006.01)

(52) U.S. Cl. ....................................................... 705/10
(58) Field of Classification Search ................... None
See application file for complete search history.

(56) References Cited

U.S. PATENT DOCUMENTS

| 4,009,525 | A | * | 3/1977 | Hollander | .................... | 434/237 |
| 4,937,439 | A | * | 6/1990 | Wanninger et al. | ......... | 235/456 |
| 5,961,332 | A | * | 10/1999 | Joao | ........................... | 434/236 |
| 6,093,026 | A | * | 7/2000 | Walker et al. | ............... | 434/322 |
| 6,159,015 | A | * | 12/2000 | Buffington et al. | ......... | 434/236 |
| 6,616,458 | B1 | * | 9/2003 | Walker et al. | ............... | 434/322 |
| 6,859,784 | B1 | * | 2/2005 | van Duyne et al. | ........... | 705/10 |

OTHER PUBLICATIONS

Katz, Leo, A New Status Index Derived from Sociometric Analysis Psychometrika, Mar. 1953, vol. 18, No. 1.*
Lewin, Arie et al., Peer Nominations: A Model, Literature, Critique and a Paradigm for Research Personnel Psychology, vol. 29, 1976, pp. 423-447.*

Newcom, Andrew et al., Children's peer relations: A meta-analytic review of popular, reject, neglected, controversial and average sociometric status, Jan. 1993, vol. 113, No. 1, Abstract.*
Maasen, Gerard et al., Nominations, Ratings, and the Dimensions of Sociometric Status International Journal of Behavorial Development, Mar. 1997, vol. 21, No. 1, Abstract.*
Bukowski, William et al., Sociometry Then & Now: Building on 6 Decades of Measuring Children's Experiences with Peer Group Jun. 1998, ISBN: 0-7879-1247-6, Abstract.*
LaFontanna, Kathryn, Children's interpersonal perceptions as a function of sociometric and peer-perceived popularity The Journal of Genetic Psychology, Jun. 1999, vol. 160, No. 2, pp. 225-242.*

(Continued)

*Primary Examiner*—Tariq R. Hafiz
*Assistant Examiner*—Scott L. Jarrett
(74) *Attorney, Agent, or Firm*—Coats & Bennett, P.L.L.C.

(57) ABSTRACT

Sociometric analysis of a group of individuals is performed using a single software application on a digital computer. The software creates a sociometric questionnaire in response to questions selected by a user. The questionnaire comprises at least one sociometric question, and typically several such questions. Each question includes a plurality of potential nominations corresponding to the individuals in the group, and solicits at least one nomination from the plurality. The software facilitates the inputting of responses to the sociometric questionnaire by displaying a replica of the questionnaire. The responses are accepted and analyzed, and each individual is classified into one of a plurality of sociometric classifications. Probability and strength scores related to the classification are calculated and reported. Reciprocal nominations and self-nominations are reported. The sociometric analysis results are output in a variety of formats, including graphic displays such as a scatterplot diagram or slider bars.

3 Claims, 5 Drawing Sheets

OTHER PUBLICATIONS

Hundley, Rachel et al., Children's Relationship with Classmates: A comprehensive analysis of frienship nominations and liking, Child Study Journal, vol. 29, No. 4, Dec. 1999.*

Phillipsen, Leslie et al., Relating Characteristics of Children and their Friends to Relational and Over Agression Child Study Journal, vol. 29, No. 4, Dec. 1999.*

Cadawallader, Tom, Sociometry reconsidered: The social context of peer rejection in childhood Journal of Group Psychotherapy, Psychodrama and Sociometry, vol. 53, No. 3/4, Oct. 1, 2000.*

3CProgram.com Web Pages Jun. 2001, Retreived from Archive.org Nov. 14, 2005.*

Sociometry.com Web Pages—Formulas Used in SociometryPlus Apr. 2001, Retrieved from Archive.org Nov. 21, 2005.*

SociometryPlus Help Files & Screen Shots Omtime, Ltd., SociometryPlus 2.0b, Apr. 2000, Retrieved from Archive.org Nov. 21, 2005.*

Shernman, Lawrence, Sociometry in the Classroom Oct. 2000, Retrieved from www.users.muohio.edu/shermanlw/sociometryfiles on Nov. 21, 2005.*

Cillessen, Antonius et al., Recent Advances in the measurement and acceptance and rejection in the peer system Josey-Bass, No. 88, Summer 2000, ISBN: 0-7879-1255-7.*

Sociometry.com Web Pages—Sociometry Plus Apr. 2000, Retrieved from Archive.org Nov. 21, 2005.*

Maassen, Gerard et al., Two-dimensional sociometric status determination with rating scales Small Group Research, vol. 27, No. 1, Feb. 1996.*

Hansen, David et al., Reconsideration of the use of peer sociometrics for evaluating social-skills training Behavior Modification, Vo. 20, No. 3, Jul. 1996.*

Frederickson, Norah et al., Sociometric classification methods in school peer groups Disciplines, vol. 39, No. 6, Sep. 1998. Abstract.*

Maassen, Gerard, Ratings as validation of sociometric status determined by nominations in longitudinal research Social Behavior and Personality, 1998.*

LaFontana, Kathryn et al., Children's interpersonal perceptions as a function of sociometric and peer-perceived popularity Journal of Genetic Psychology, vol. 160, No. 2, Jun. 1999.*

Newcomb, Andrew F. et al., Children's Peer Relations: A Meta Analytic Review of Popular, Rejected, Neglected, Controversial and Average Sociometric Status, Psycological Bulletin, vol. 113, No. 1, 1993, pp. 99-128.*

Frederickson, Norah L. et al., Sociometric Classification Methods in School Peer Groups: A Comparative Investigation Journal of Child Psychology and Psychiatry, vol. 39, No. 6, pp. 921-933.*

Robert, Terry et al., A Comparison of Methods of Defining Sociometric Status among Children. Developmental Psychology, vol. 27, No. 5, pp. 867-881 Sep. 1991, Abstract.*

MacDonald, Christine Dian, Gender and peer relations: Sociometric Classification and behavior correlates Memphis State University, 1993, AAT 9402995, Abstract.*

Terry, Robert et al., A Comparison of Methods for Defining Sociometric Status Among Schoolchildren Developmental Psychology, vol. 27, No. 5, 1991, pp. 867-880.*

DeRosier, Melissa E. et al., Children's Academic and Behavorial Adjustment as a Functino of the Chronicity and Proximity of Peer Rejection, Child Development, vol. 65, 1994, pp. 1799-1813.*

Mize, Sara Jane Saarinen, Peer Reputation and Sociometric Status: Comparison of Neglected, Rejected, and Average Status Groups, University of Cincinatti, 1995.*

Maassen, Gerald H., Ratings as validation of sociometric status determined by nominations in longitudinal research Social Behavrio and Personality, 1998.*

Maassen, Gerard H. et al., SSRAT: The processing of rating scales for the determination of two-dimensional sociometric status Behavior Research Methods, Instruments & Computers, vol. 30, No. 4, 1998, pp. 674-679.*

Frederickson, Norah L. et al., Sociometric Classificaiton Methods in School Peer Groups: A Comparative Investigation Journal of Child Psychology, Psychiatry, vol. 39, No. 6, 1998, pp. 921-933.*

Bagwell, Catherine L. et al., Peer Clique Participation and Social Status in Preadolescence Merrill-Palmer Quarterly, vol. 46, No. 2, Apr. 2000, pp. 280-305.*

Massen, Gerard et al., Nominations, Ratings, and the Dimensions of Sociometric Status International Journal of Behavioral Development, vol. 21, No. 1, 1997, pp. 179-199.*

Peery, Craig J., Popular, Amiable, Isolated, Rejected: A Reconceptualization of Sociometric Status in Preschool Children Child Development, vol. 50, No. 4, Dec. 1979, Abstract.*

Ward, Wendy L., Distinctions Between Sociometric Status Groups: Internalizing Difficulties The University of North Carolina at Greensboro, Dissertation, 1996.*

"A Preliminary Study of Developmental Trends in Sociempathy: Accuracy of Perception of Own and Others' Sociometric Status" by David P. Ausubel and Herbert M. Schiff; Child Development, vol. 23, No. 2 (Jun. 1952); pp. 112-129.

"Dimensions and Types of Social Status: A Cross-Age Perspective" by John D. Coie, Kenneth A. Dodge, and Heide Coppotelli; Developmental Psychology 1982, vol. 18, No. 4; pp. 557-569.

"New Directions for Child and Adolescent Development" by William Damon; Jossey-Bass online Journals and Periodicals; No. 88, Summer 2000; (3 pages).

"Peer Relationships, Child Development, and Adjustment: A Developmental Psychopathology Perspective" by Jeffrey G. Parker, Kenneth H. Rubin, Joseph M. Price, and Melissa E. DeRosier; pp. 96-161.

"Ethical Administration of Sociometric Measures: Procedures in Use and Suggestions for Improvement" by Debora Bell-Dolan and Audrey E. Wessler; Professional Psychology, 1994, vol. 25, No. 1; pp. 23-32.

"Peer Rejection in Childhood" edited by Steven R. Asher and John D. Coie; Cambridge Studies in Social & Emotional Development; pp. 3-14.

"Peer Rejection in Childhood" edited by Steven R. Asher and John D. Coie; Cambridge Studies in Social & Emotional Development; pp. 365-401.

* cited by examiner

SCAN (Sociometric Collection and Analysis) Results
Individual Student Report
*CONFIDENTIAL*

Student's Name: John Millbrook
Student's ID#: 5103
Grade: 5
Teacher's Name: Brown
School Name: Washington
Counselor Name: Jean Sculati
Date Sociometrics were collected: March 2001
Today's date: August 15, 2001

Go to summary results for:
   Social Status
   Social Acceptance
   Social Behavior
   Reciprocal Nominations
   Self Nominations Go to grouped student data for:
   Social Status
   Social Acceptance
   Social Behavior
   Reciprocal Nominations
   Self Nominations

Scatterplot of Social Acceptance:

For Entire Grade:

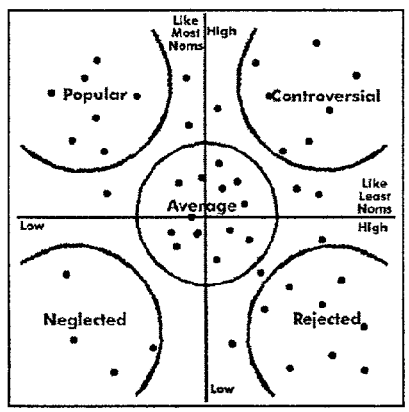

For John:

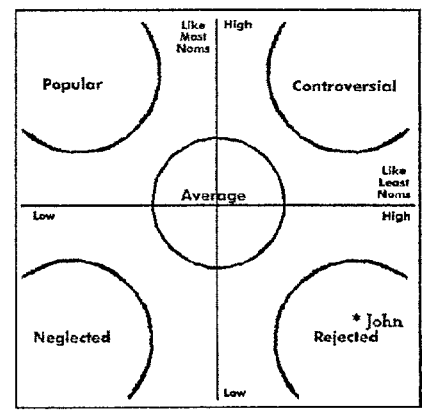

Social Status:
   Status Group: Rejected
   Strength Score: 2
   Social Preference:   -2.1
                     ▽
   Social Impact:         1.8
                     ▽

Probability Scores:
   Rejected: 30
   Controversial: 19
      Average: 7
   Controversial: 19
   Neglected: 2
   Popular: 0
   Unclassified: 20

Figure 4A

Social Acceptance and Behavior:

| Sociometric | Z Score | Who Chose John | Who John Chose | John Chose Self |
|---|---|---|---|---|
| Like Most | -1.8 ▽ | 5101, 5205, 5122 | 5112, 5233, 5330, 5333, 5334, 5432, 5433, 5434, 5435 | Yes |
| Like Least | 1.5 ▽ | | | |
| Friend | -2.1 ▽ | | | |
| Best Friend | -2.1 ▽ | | | |
| Very Best Friend | -2.1 ▽ | | | |
| Aggression | -2.1 ▽ | | | |
| Aggression-Indirect | -2.1 ▽ | | | |
| Bullying | -2.1 ▽ | | | |
| Victimization | -2.1 ▽ | | | |
| Immature | -2.1 ▽ | | | |
| Shy | -2.1 ▽ | | | |

Figure 4B

SYSTEM AND METHOD FOR PERFORMING SOCIOMETRIC DATA COLLECTION AND ANALYSIS FOR THE SOCIOMETRIC CLASSIFICATION OF SCHOOLCHILDREN

FIELD OF THE INVENTION

The present invention relates generally to the field of behavioral psychology, and specifically to a system and method of collecting and analyzing sociometric data to identify and assess social and behavioral problems in a group of individuals, such as schoolchildren in a particular grade or class.

BACKGROUND OF THE INVENTION

Social and behavioral problems in school children are well known. For example, almost every class has its bullies and their victims. Some children are popular; others are neglected by their peers. These social and behavioral problems are known to adversely impact some children's psychological and emotional development. In extreme cases, they may even manifest themselves as outbreaks of violence, such as school shootings. It is also well known that psychologists and mental health professionals can assist students with behavioral problems through a variety of interventions—assuming the problem children can be accurately identified.

Identification of children with behavioral problems is deceptively difficult. Research indicates that their teachers identify only twenty percent of peer-rejected children. Parents are only slightly more accurate, identifying just over thirty percent of children disliked by their peers. Over fifty years of research has shown that the most accurate means of identifying children with social and behavioral problems within the school environment is through sociometric analysis utilizing peer nomination data. Children are asked a series of questions relating to interpersonal relationships and social status, such as whom they most like among their peers, whom they like least, who is picked on, who is aggressive, and the like. The children nominate others in each of these categories from a list of their peers. This peer nomination data is then subjected to statistical analysis to reveal how each child is viewed by his or her peers. See A. H. Cillessen & W. M. Bukowski, *Conceptualizing and Measuring Peer Aceptance and Rejection, Recent Advances in the Measurement of Acceptance and Rejection in the Peer System* 3-10 (Jossey-Bass, 2000), the disclosure of which is incorporated herein in its entirety.

While sociometric analysis has proven to be a valuable tool in identifying children with behavioral problems, it is one that is difficult to utilize effectively, particularly by education professionals in the school environment. Typically, a behavioral psychologist prepares the sociometric questionnaire. A list of all students in the peer group— typically all of the children in a particular grade level—must be compiled (and preferably alphabetized by first name, a time-consuming and error-prone task when performed by hand). Once the questionnaire is administered to the students and their responses collected, the data must be entered into a data entry program, and analyzed, often requiring reprogramming of a statistical analysis tool by a statistician.

For example, one aspect of sociometric analysis that has proven useful is the classification of children based on their peer nomination results into one of several groups or sociometric classifications. See J. D. Cosie, et al., *Dimensions and Types of Social Status: A Cross-Age Perspective*, 18 *Developmental Psychology* 557 (1982), the disclosure of which is incorporated herein in its entirety. The statistical analysis tools must be programmed to define these categories and the rules with which children are classified into them. Typically, due to the complexity of the analysis required, only the classification itself is preserved. That is, no scores or weights are generated indicative of the confidence or strength of a given student's classification, or the probability that the same student would be similarly classified in a subsequent survey. Additionally, also due to the complexity of traditional sociometric statistical analysis, self-nominations (indicative of how a student views his or her own social standing) and reciprocal nominations (complimentary pairs of students who nominate each other as least or most liked) are not utilized or even retained. However, both of these types of data are useful to behavioral psychologists and are indicative of important information that can be used in assessing a child's social and behavioral well-being.

Thus, a need exists in the art for a way to streamline and simplify all aspects of sociometric analysis, including data collection, data entry, data analysis and reporting. Furthermore, a need exists in the art for a sociometric analysis tool that can be utilized by education professionals, and does not require the guidance or assistance of behavioral psychologists, statisticians, or others with special skills or training.

SUMMARY OF THE INVENTION

The present invention relates to a method of performing sociometric analysis of a group of individuals using a single software application on a digital computer. The software creates a sociometric questionnaire in response to questions selected by a user. The sociometric questionnaire comprises at least one sociometric question, and typically several such questions. Each sociometric question includes a plurality of potential nominations corresponding to the individuals in the group, and solicits at least one nomination from the plurality. The software facilitates the inputting of responses to the sociometric questionnaire by displaying a replica of the questionnaire. The responses are accepted and analyzed. Sociometric scores are generated and standardized across the group. Each individual is classified into one of a plurality of sociometric classifications. Probability and strength scores related to the classification are calculated and reported. Reciprocal nominations and self-nominations are reported. The sociometric analysis results are output, such as by being displayed as a scatterplot, wherein selected individuals and sub-groups of individuals may be highlighted, and wherein sociometric classifications may be indicated. Analysis results may also be output as graphic slider bars.

BRIEF DESCRIPTION OF DRAWINGS

FIG. 4 is a representative report according to one embodiment of the present invention.

DETAILED DESCRIPTION OF THE INVENTION

The present invention relates to a single, integrated software application for facilitating the sociometric analysis of a group of individuals. In particular, the SCAN™ program (Sociometric Collection and ANalysis) and its use in the school environment are described herein in significant detail. However, it will be readily apparent to one of skill in the art that the present invention is not limited to either the SCAN™ software application or the sociometric analysis of school children—but rather encompasses any single software application that performs the functions described herein, and is applicable to any group of individuals.

Figure 1:
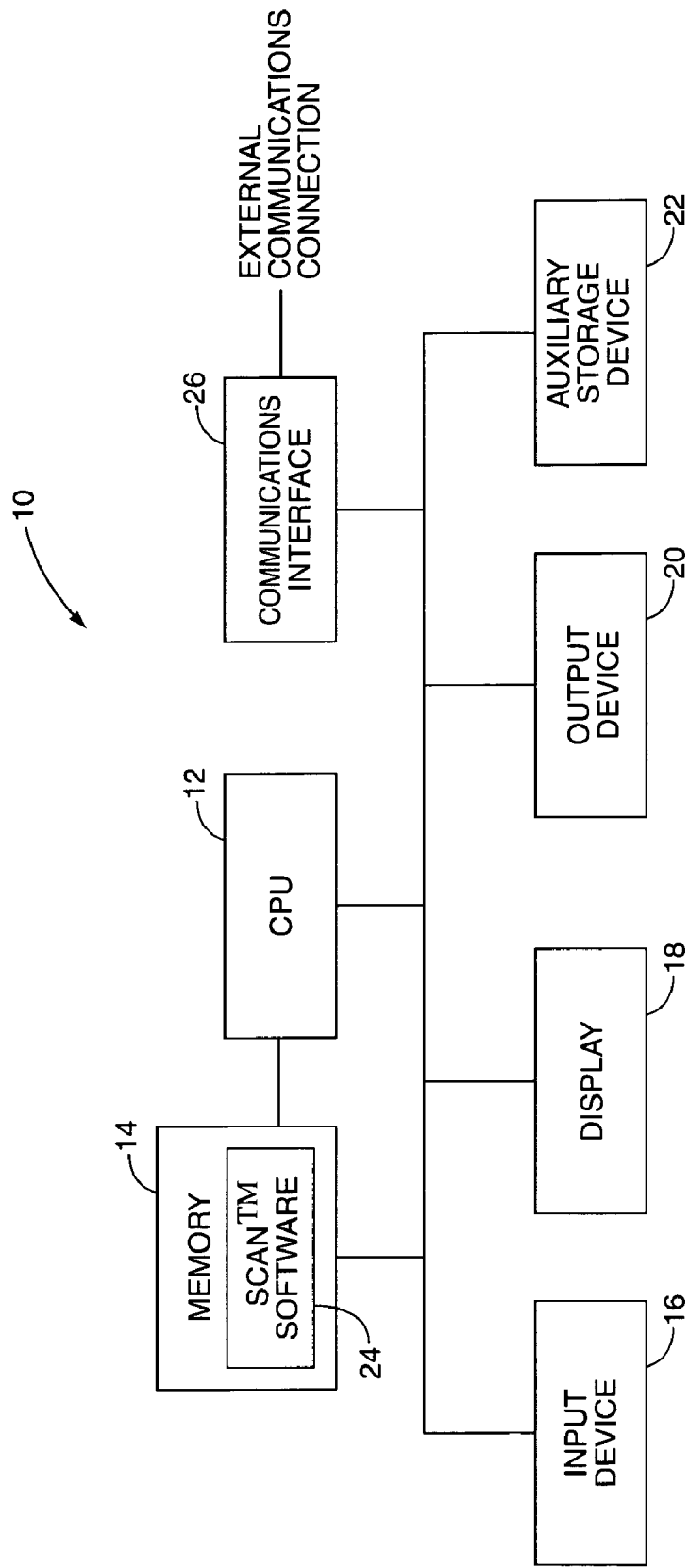
FIG. 1 is a representative block diagram of a digital computer.

The software application of the present invention may be compiled for and executed on any general-purpose digital computer. A "computer" is defined herein as any data processing device including microprocessors, conventional personal computers, engineering workstations, personal digital assistants, and the like, whether stand-alone or interconnected via a network. The term is meant to be construed broadly. A representative digital computer is depicted in block diagram form in FIG. 1. Computer 10 comprises central processing unit (CPU) 12, memory 14, input device 16, and display 18. Computer 10 is optionally connected to an output device 20, and may include or be connected to auxiliary storage device 22 and/or a communications interface 26. CPU 12 may comprise a standard microprocessor, such as an 80x86®, PENTIUM®, 68xxx®, or compatible architecture processor; a reduced instruction set computer (RISC) processor, such as an ARM®, SPARC®, or PowerPC®; a digital signal processor (DSP); or an application specific integrated circuit (ASIC) designed to interpret and executed stored program instructions. CPU 12 may include graphics or floating-point co-processors, cache memory, interrupt handlers, clocks, and similar support circuits, as are known in the computing arts. Memory 14 may comprise RAM, DRAM, SDRAM, FRAM, ROM, PROM, EPROM, EEPROM, or other solid-state computer memory as are known in the computer arts. Memory 14 may be hierarchically organized, including non-solid-state memory devices such as a hard drive, CD-ROM, CD-R, CD-RW, DVD-ROM, floppy disk, magnetic tape, or other form of computer data storage. Memory 14 stores various data used by the CPU 12, and in particular, contains software 24, comprising instructions for execution on CPU 12. Software 24 may, in general, include hardware drivers and one or more hardware-level operating systems such as a BIOS; a computer operating system such as WINDOWS®, Macintosh®, or UNIX®; various application program interfaces and language interpreters, such as BASIC, FORTH® or JAVA®; and/or applications software programs, such as WORD®, EXCEL®, or SCAN™ (one embodiment of the software application of the present invention).

The input device 16 may comprise a scanner, keyboard, keypad, computer mouse, TRACKPOINT® lever, touchpad, joystick, digitizing pad, microphone with associated voice recognition hardware and/or software, tactile glove, or the like. The input device 16 allows a user to enter data into the computer 10, indicate selections, chose options, and the like. The display 18 may comprise a text or graphic output display, that may be of any technology or type known in the art, illustratively including a video display (cathode ray tube or projection), any of a variety of passive or active matrix liquid crystal displays (LCD), plasma display panel, electroluminescent display, field emission display, light emitting diodes (LED), holographic projection, or the like. The display 18 communicates information and prompts to a user, presents choices for selection, may provide feedback to control functions, such as through a Graphic User Interface (GUI). In some embodiments, the input device 16 and display 18 may merge, such as in the case of touchscreen displays, or light pens. The output device 20 may comprise a text and/or graphics printer, such as a dot matrix, laser, inkjet, or daisy wheel printer; a graphic device such a pen plotter, or the like. According to the present invention, the output device 20 may print sociometric questionnaires, plot sociometric analysis outputs such as scatterplot charts, print textual sociometric analysis outputs, and the like. The auxiliary storage device 22 may comprise a floppy drive, a CD-ROM, CD-R, CD-RW, or DVD-ROM drive, a ZIP® drive, a magnetic tape drive, or the like. The auxiliary storage device 22 facilitates the loading of the software application of the present invention from the appropriate carrier or media into the computer 10 for execution thereon, and may additionally facilitate the transfer of sociometric data into and/or out of the computer 10. Finally, the computer 10 may include a communications interface 26, such as for example an electrical or optical network connection, such as ETHERNET®, FDDI, or the Internet; a modem connected to a wired or wireless telephone or cable service; or a wireless network interface, such as BLUETOOTH®. The communications interface 26 may be utilized in much the same manner as an auxiliary storage device 22 for the loading of software and transfer of data, and may in addition provided expanded communications and distributed processing capability. In particular, either the media associated with an auxiliary storage device 22 or the communications interface 26 may comprise a "computer readable carrier" effective to load a software application, such as the SCAN™ program of the present invention, into a computer 10.

The SCAN™ program automates and streamlines much of the effort required to perform sociometric analysis. As used herein, "sociometric analysis" refers to the method of obtaining and analyzing an individual's social and behavioral posture through peer nomination data. Each individual nominates one or more of his peers in various categories or questions indicative of social or behavioral qualities. For example, questions such as "who do you like the most?" are asked, with the individual's entire peer group appearing on a list for possible nomination. The nominations selected by the individuals in the group, relating to a variety of questions, are then compiled and analyzed to reveal each individual's social and behavioral status as viewed by the peer group. This analysis is often intricate and complex. According to the present invention, the major tasks associated with performing a sociometric analysis on a group of individuals are automated within a single software application.

Figure 2:
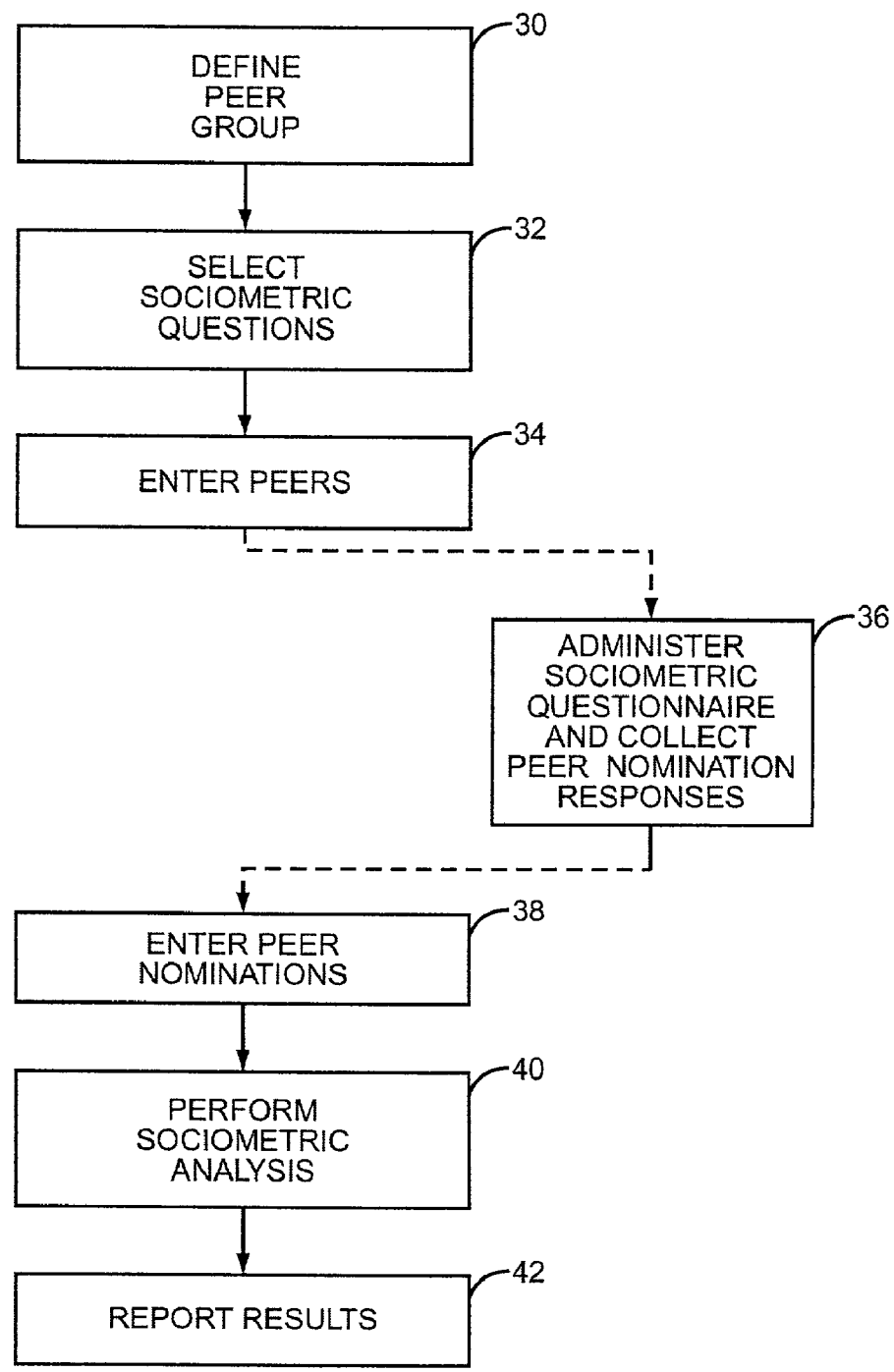
FIG. 2 is a flow chart depicting the steps a representative sociometric analysis process.

The sociometric analysis begins with the identification of the relevant group, as depicted in FIG. 2 by block 30. In a school environment, this is typically a grade (such as for example, the third grade). A grade may include several classes that are handled as sub-groups within the peer group. Other group structures are, of course, possible. For example, in very large schools, the peer group may comprise only a portion of a grade. Alternatively, in smaller schools, a peer group may comprise two or more grades.

Once the peer group is defined, the data collection process begins with the creation of a sociometric questionnaire comprising one or more sociometric questions, at block 32. The SCAN™ program facilitates the generation of sociometric questionnaires by providing a series of relevant questions that may be easily included. Among these, listed by way of example and not limitation, are questions such as:

Who do you like most? Who do you like least? Who is aggressive? Who is teased often? Who is picked on? Who is shy? Who is weird or strange? Who are your friends? Who are your best friends? Having a user select the sociometric questions from among a pre-defined list not only facilitates ease of creation of the sociometric questionnaire, but also enhances the consistency and repeatability of sociometric analyses performed among different groupings of individuals, or at different times. Additionally, the selection of pre-determined sociometric questions facilitates the use of the software by lay persons, as the sociometric analysis functionality of the software "knows" the significance of the questions selected, and can generate significant useful results in reliance on the pre-determined interrelationship of the sociometric questions, without requiring re-programming or manipulation of the statistical analysis engine to process new data types.

Once the sociometric questions are selected, the list of individuals comprising the peer group is entered, at block 34. Particularly where the peer group includes children, the list of names associated with each question should ideally be sorted by first name, so that a child may more easily locate the name that comes to mind as a nomination for that question. Additionally, the names should be subdivided into subgroups, such as classrooms, if subgroups are utilized. The SCAN™ program may facilitate the entry of the peer group list by automatically alphabetizing entries by first name as they are entered, and/or by organizing the entries by classroom. The SCAN™ program may additionally generate a unique identification number and assigns it to each name as it is entered.

When the names of all individuals in the peer group have been entered and the sociometric questions selected, a sociometric questionnaire is generated. The sociometric questionnaire includes the series of sociometric questions selected, each together with all names within the peer group, preferably on a single page. Thus, there are as many pages in the sociometric questionnaire as there were sociometric questions selected.

The sociometric questionnaires are then administered to the peer group, at block 36. Each individual nominates one or more others from his or her peer group that best answer each sociometric question.

The compilation of results of the sociometric questionnaire, i.e., entering all of the nominations for each of the sociometric questions (block 38), is typically one of the most error-prone phases of traditional sociometric analysis. According to typical prior art methods, the data were entered into a word processing or data entry program, such as Paradox®, which may have required input in a variety of formats, leading to confusion and resulting errors. According to one embodiment of the present invention, data entry is simplified and accuracy increased through the display of a replica of each sociometric question, with the entire nominating group available for selection. In other words, for each sociometric question, the question and the entire peer group appear on the computer display 18 (see FIG. 1) in a format directly analogous to the printed form in the sociometric questionnaire. Thus, a user entering results from the questionnaire would, for each sociometric question from each individual, simply select the entries on the on-screen form that correspond to the entries indicated on the sociometric questionnaire. In the broad practice of the present invention, this display and selection may comprise any of a variety of selection processes, utilizing the computer display 18 and input device 16. For example, the form may be displayed on a touch-sensitive computer display, with the user physically selecting the appropriate entries by touching the screen, either by hand or using a light pen or similar device. In another embodiment, the user entering the data may move an indicator or pointer to a desired nomination via manipulating the computer input device 16 (such as a computer mouse, joystick, or the like). The desired entry may then be selected by performing an input action appropriate to the input device 16 (such as pressing a mouse button, pulling the trigger on a joystick, or the like). The selected nominations on the on-screen replica are indicated, such as by highlight, reverse video, an associated check-box or radio button, or similar visual indicator. When all of the indicated nominations from the sociometric questionnaire have been indicated on the replica, the replica and the questionnaire will match. At this point, the user may indicate that the data is to be accepted, and go on to the next question (or the next individual). Data entry is thus essentially reduced to a visual pattern-matching exercise, which is known in the art to reduce errors and speed the data entry process.

In one embodiment of the present invention, data entry includes error checking. The responses for one or more individuals to one or more sociometric questions are re-input on a blank on-screen replica. The input selections are then checked against the previously input selections for that individual and that question, and errors are flagged. This error checking may be performed on a subset of the sociometric questionnaires, to generate a representative error rate regarding data input.

The software application of the present invention dramatically simplifies and speeds the analysis of sociometric data (block 40). Traditional sociometric classifications and indicators are calculated automatically. Use of the software allows education professionals to incorporate sociometric analysis into their student assessments, as it does not require familiarity or expertise with statistics. Furthermore, through retention and reporting of sociometric data typically lost in prior art sociometric analysis methodologies, valuable additional information is available as part of the analysis results of the present invention.

The classification of individuals in the peer group into sociometric groups or classes has been a useful feature of sociometric analysis for nearly twenty years. In one embodiment, the software application according to the present invention not only computes sociometric classifications, but also displays the classification data and the individuals in each class in an innovative and intuitive manner (block 42).

While the classification of individuals according to many different metrics is possible, six sociometric classifications based on nominations for Liked Most and Liked Least status are described herein in detail. This description is illustrative only, and the present invention is not limited thereby. Nominations for Liked Most (LM) and Liked Least (LL), as well as all other sociometrics, are collated across the entire group, and the mean and population standard deviations are calculated. For each individual assessed, his or her nominations for, e.g., LM and LL are summed from among all individuals completing the sociometric questionnaire, and standardized across the nominating group. These standardized scores are referred to herein as "z-scores," such as zLM and zLL. Conceptually, zLM, for example, quantifies how far the individual differs from the mean number of "Liked Most" nominations for the group. The extent of the difference is expressed relative to the standard deviation for the group. Thus, for example, a zLM score of 2.0 indicates that the number of "Liked Most" nominations the individual received was exactly two standard deviations greater than the mean. In this example, standard probability theory would then estimate that the individual is in the 95th percentile of "Liked Most" nominations among the group.

A Social Preference (SP) score is computed for each individual by subtracting the zLL nominations from the zLM nominations. A Social Impact (SI) score is computed by summing the zLL and zLM scores. The Social Preference and Social Impact scores are standardized across the nominating group. Individuals are then classified into one of six sociometric classifications according to the following rules (wherein zSP, zSI, zLL, and zLM notations indicate standardized scores):

| | |
|---|---|
| Popular: | zSP > 1, zLL < 0, and zLM > 0; |
| Rejected: | zSP < −1, zLL > 0, and zLM < 0; |
| Neglected: | zSI < −1, zLL < 0, and zLM < 0; |
| Controversial: | zSI > 1, zLL > 0, and zLM > 0; |
| Average: | −0.5 < zSP < 0.5 and −0.5 < zSI < 0.5; and |
| Unclassified: | all others. |

Figure 3:
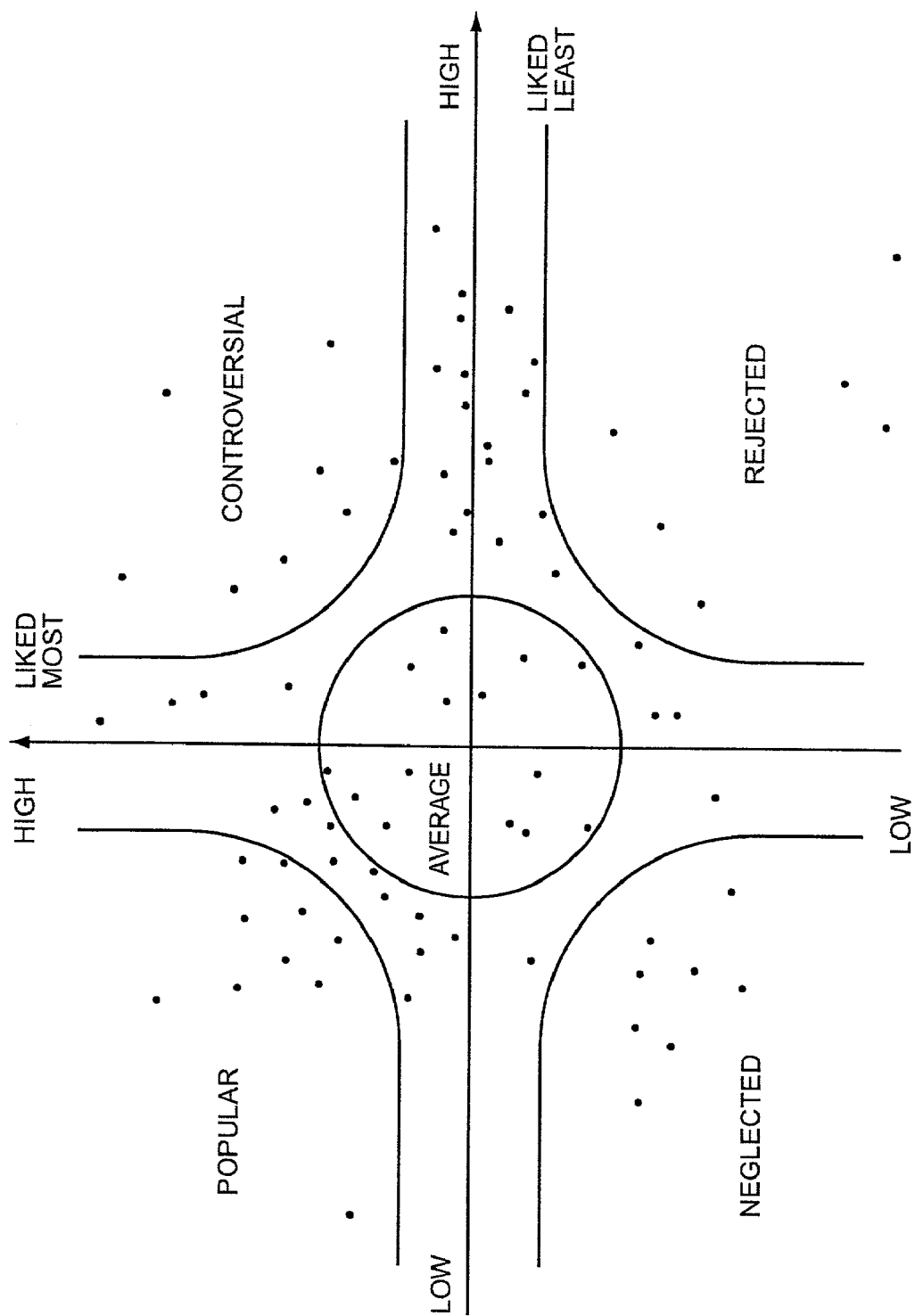
FIG. 3 is a representative scatterplot diagram depicting sociometric analysis results, according to one embodiment of the present invention.

In one embodiment, the software of the present invention provides a unique and innovative method of displaying the sociometric classifications, the individuals so assigned, and a variety of related information. FIG. 3 depicts a scatterplot diagram of a sociometric analysis and classification based on the Liked Least and Liked Most peer nominations. The Cartesian axes represent the total nominations in each of the standardized Liked Least and standardized Liked Most categories. Each individual is represented by a point or dot in a scaled spatial relationship representative of that individual's nominations by his or her peers for the two categories. Five of the sociometric classifications are depicted as spatial areas, denoted generally by curved lines. As an example, an individual receiving a large number of Liked Most nominations and a small number of Liked Least nominations would be plotted in the upper left quadrant of the scatterplot, and classified as Popular.

According to one embodiment of the present invention, the scatterplot of FIG. 3 may be rendered more useful, particularly when it is displayed on the computer display 18, by highlighting one or more points representing individuals. Thus, one or more individuals may be quickly located and his or her classification and relative degree of placement within that classification may be quickly ascertained. Additionally, groups of individuals, such as for example a particular classroom, may be highlighted. In one embodiment, the selections and highlights may be preserved in rendering the scatterplot on the computer output device 20.

As mentioned above, and as is apparent with reference to FIG. 3, individuals may fall more or less solidly within one of the sociometric classifications. For example, an individual's scatterplot point may fall on or near the border of a sociometric classification. A fairly small change in the number of nominations for that individual, for example in a subsequent survey, may result in a different classification. In contrast, the scatterplot points representing other individuals may fall solidly within the area representing the sociometric classification (i.e., relatively distant from the axes). These individuals are more reliably classified, in that their classification is not likely to change from one sociometric analysis to the next. This difference in the "degree" of an individual's classification may indicate entirely different intervention strategies, yet this information does not appear in traditional sociometric analysis. According to the present invention, one indication of classification strength is inherent in the visual scatterplot display of FIG. 3, simply by noting the placement of an individual relative to the axes and the displayed group boundaries.

In addition, in one embodiment of the present invention, probability and strength scores as quantitative measures of the accuracy and strength of an individual's classification are computed and reported along with each individual's sociometric classification. First, a set of relative probabilities are calculated indicative of whether a given individual will receive each of the six possible classifications upon re-assessment, irrespective of his or her current classification. Additionally, a strength score is calculated that indicates the degree to which that designation is likely to hold on repeated sociometric assessments (the classification is "fixed") or whether it may change (the classification is "fluid").

While similar, the two measurements have different uses. The strength scores provide a good subclassification mechanism to be applied across a group of individuals. For example, behavioral psychologists may decide to treat the students classified as "Rejected" with high strength scores differently from those in the same classification with low strength scores. The probability scores, on the other hand, assist in the characterization of an individual. An inspection of probability scores for all six classifications, for example, may reveal that an individual whose highest relative probability and current classification is "Unclassified" is actually on the borderline for "Rejected" status, and may benefit from intervention.

Probability scores are calculated based on the following premise: if a sufficiently large number of sociometric analyses were performed according to the present invention, then the plotting of "z-scores" of each of the questions administered (i.e., standardized Liked Most, standardized Liked Least, etc.) for a given individual would take the form of a series of normal distributions, where the mean of each distribution would be the individual's current score on that question, and the mean of the standard deviations equivalent to the standard deviation of the current distribution. The probability that the individual's z-score on a given question will be above or below a target value on a re-assessment can be estimated as the corresponding area under the normal curve between the individual's current z-score and the target value. Conceptually, this area represents overlapping normal curves, displaced by the difference between the individual's current z-score and the target value. Mathematically, these probabilities are calculated as follows. The probability that, e.g., the standardized Social Preference (zSP) score will be greater than one for a given individual upon a re-assessment is calculated as the Cumulative Density Function (cdf) of the value zSP−1. This quantity represents the area under the normal curve from negative infinity to a projected z-score of zSP minus one. This probability is labeled PzSPPos1, and its derivation is expressed as:

$$PzSPPos1 = P(zSP) > 1 = cdf(zSP-1)$$

Similarly, other Social Preference estimates are:

$$PzSPNeg1 = P(zSP) < -1 = cdf(-1-zSP)$$

$$PzSPNominal = P(-1 < zSP < 1) = 1 - PzSPPos1 * 1 - PzSPNeg1$$

$$PzSPAverage = P(-0.5 < zSP < 0.5) = (1 - cdf(zSP-0.5)) * cdf(0.5 + zSP)$$

Similar calculations for Social Impact score yield:

$$PzSIPos1 = P(zSI) > 1 = cdf(zSI-1)$$

$$PzSINeg1 = P(zSI) < -1 = cdf(-1-zSI)$$

$$PzSINominal = P(-1 < zSI < 1) = 1 - PzSIPos1*1 - PzSINeg1$$

$$PzSIAverage = P(-0.5 < zSI < 0.5) = (1 - cdf(zSI - 0.5))*cdf(0.5 + zSI)$$

Probabilities of scores greater or less than zero for, e.g., zLM and zLL are calculated:

$$PzLMPos = P(zLM > 0)$$

$$PzLMNeg = 1 - PzLMPos$$

$$PzLLPos = P(zLL > 0)$$

$$PzLLNeg = 1 - PzLLPos$$

The probability of each sociometric classification is then calculated from these probability components, using the classification rules described above:

$$P(Popular) = [P(zSP > 1)*P(zLL < 0)*P(zLM > 0)]$$

$$P(Rejected) = [P(zSP < -1)*P(zLL > 0)*P(zLM < 0)]$$

$$P(Neglected) = [P(zSI < -1)*P(zLL < 0)*P(zLM < 0)]$$

$$P(Controversial) = [P(zSI > 1)*P(zLL > 0)*P(zLM > 0)]$$

$$P(Average) = [P(-0.5 < zSP < 0.5)*P(-0.5 < zSI < 0.5)]$$

$$P(Unclassified) = [P(-1 < zSI < 1)*P(-1 < zSP < 1)] - P(Average)$$

Substituting the calculated probability components, $$P(Popular) = PzSPPos1*PzLLNeg*PzLMPos$$

$$P(Rejected) = PzSPNeg1*PzLLPos*PzLMNeg$$

$$P(Neglected) = PzSINeg1*PzLLNeg*PzLMNeg$$

$$P(Controversial) = PzSIPos1*PzLLPos*PzLMPos$$

$$P(Average) = PzSPAverage*PzSIAverage$$

$$P(Unclassified) = (PzSINominal*PzSPNominal) - P(Average)$$

$$TotalP = P(Popular) + P(Rejected) + P(Neglected) + P(Controversial) + P(Average) + P(Unclassified)$$

This yields a set of six numbers, each between zero and one. These probabilities are normalized, or scaled relative to each other, by dividing each score by the sum of all six. This results in a set of relative probability values that sum to one, which enables characterizations of the relative influence of each on an individual's classification. These relative probabilities may be scaled up to the more familiar 0-100% range before being reported in the sociometric analysis output. The relative probabilities are thus calculated as:

$$RP(Popular) = [P(Popular)/TotalP]*100,$$

$$RP(Rejected) = [P(Rejected)/TotalP]*100, \text{ etc.}$$

The strength scores are calculated by consideration of the relative probability that corresponds to each classification. The strength score represent the degree to which an individual's assigned sociometric classification is fixed versus fluid. In one embodiment, the strength scores comprise one of three levels, defined as:

| Label | Score | Assignment Criterion | Description |
| --- | --- | --- | --- |
| Highly Fixed | 3 | RP(classification) > .75 | very low probability that classification would change with new assessment |
| Fixed | 2 | .5 < RP(classification) < .75 | |
| Fluid | 1 | RP(classification) < .5 | very high probability that classification would change with new assessment |

Conceptually, strength scores only apply to individuals who fall into one of the five sociometric classifications. In one embodiment of the present invention, however, even unclassified individuals are assigned a strength score that is associated with the classification towards which the individual tends. These strength score may be coupled with a code indicative of the individual's unclassified status, but indicating the closest classification, such as UP (unclassified but closest to popular), UN (unclassified but closest to neglected), UC (unclassified but closest to controversial), or UR (unclassified but closest to rejected).

In peer nomination sociometric analysis, it is often the case that a first individual will nominate a second individual as, e.g., Most Liked. The second individual will also nominate the first individual as Most Liked. Such mutual selections are referred to as "reciprocal nominations." This information is valuable in that reciprocal friend pairs (or conversely, "enemy" pairs) are known to be more stable over time than non-reciprocated pairs. Additionally, individuals' risk for adjustment problems may vary depending on the reciprocity of specific nominations. Traditionally, reciprocal nomination information is not retained in sociometric analyses, as mining this information from the nomination data is extremely cumbersome, time-consuming, and complicated. According to one embodiment of the present invention, reciprocal nomination data is extracted, maintained, and reported with each individual's analysis. For example, in one embodiment, reciprocal nominations may be highlighted in the scatterplot of FIG. 3.

Another example of information that is valuable for analysis, but not extracted or reported in traditional sociometric analysis, is self-nomination. Self-nominations offer insight into how an individual views himself or herself in the social structure with his or her peers. For statistical reasons, self-nominations are not included in sociometric calculations such as those defining sociometric classifications. Thus, self-nominations are typically disallowed—individuals participating in the sociometric analysis are simply not allowed to nominate themselves in prior art methodologies. According to one embodiment of the present invention, self-nominations are allowed, input, and reported, but are not included in the statistical analysis.

While sociometric categories and their related scores are centrally important to those conducting or interpreting the sociometric analysis, the information related to all individuals sociometric questions that the user selects is important to note and report. In one embodiment of the present invention, standardized scores for each question, including for example Liked Most and Liked Least, are provided so that each individual's level on each question can be compared to that within the peer group. In one embodiment, this information is presented in a novel and intuitive manner by graphic slider bars that depict each individual's placement on a question relative to the group. This form of presentation greatly aids interpretation of this data by behavioral psychologists and others who must interpret the sociometric analysis results. An example of these slider bars is depicted in the sample output of FIG. 4. FIG. 4 is an illustrative example of one form of reporting the results of sociometric analysis, in this case the results for one individual. Many additional, or alternative, output formats are possible, and the present invention is not limited to the example of FIG. 4. The number of nominations, standardized scores, and percentage rankings within the group or defined subgroups may be reported as summary information for the entire group (such as a grade in a school), for a particular subgroup (such as one or more classrooms within a grade), and/or for one or more individuals. In one embodiment, the output may be sorted by individuals' scores on any of the sociometric questions (e.g., most liked, aggressive, etc.).

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of sociometric analysis of a group of schoolchildren, comprising:

surveying the schoolchildren to obtain peer nominations to social preference questions;

analyzing the peer nominations to generate standardized Liked Most (zLM) and Liked Least (zLL) metrics for each schoolchild;

generating standardized Social Preference (zSP) and Social Impact (zSI) scores from the zLM and zLL metrics;

classifying each schoolchild into one of a plurality of mutually exclusive sociometric social classifications based on the zSP, zSI, zLM, and zLL values; and generating a probability score for each schoolchild indicative of the probability of the schoolchild being classified in each sociometric social classification upon re-assessment, wherein the probability of each schoolchild's Social Preference score upon re-assessment would fall within the numeric ranges of greater than +1, less than −1, between −1 and +1, and between −0.5 and +0.5, are respectively:

PzSPPos1=$P$(zSP)>1=cdf(zSP−1);

PzSPNeg1=$P$(zSP)<−1=cdf(−1−zSP);

PzSPNominal=$P$(−1<zSP<1)=1−PzSPPos1*1−PzSPNeg1; and

PzSPAverage=$P$(−0.5<zSP<0.5)=(1−cdf(zSP−0.5))*cdf(0.5+zSP);

where cdf(*) denotes a cumulative density function.

2. The method of claim 1 wherein the probability of each schoolchild's Social Impact score upon re-assessment would fall within the numeric ranges of greater than +1, less than −1, between −1 and +1, and between −0.5 and +0.5, are respectively:

PzSIPos1=$P$(zSI)>1=cdf(zSI−1);

PzSINeg1=$P$(zSI)<−1=cdf(−1−zSI);

PzSINominal=$P$(−1<zSI<1)=1−PzSIPos1*1−PzSINeg1; and

PzSIAverage=$P$(−0.5<zSI<0.5)=(1−cdf(zSI−0.5))*cdf(0.5+zSI);

where cdf(*) denotes a cumulative density function.

3. The method of claim 1 wherein the probability of each schoolchild's Liked Most and Liked Least scores upon re-assessment being greater or less than zero, are respectively:

PzLMPos=$P$(zLM>0);

PzLMNeg=1−PzLMPos;

PzLLPos=$P$(zLL>0); and

PzLLNeg=1−PzLLPos;

the probability score for each schoolchild indicative of the probability of the schoolchild being classified in each sociometric social classification upon re-assessment are calculated as:

$P$(Popular)=PzSPPos1*PzLLNeg*PzLMPos;

$P$(Rejected)=PzSPNeg1*PzLLPos*PzLMNeg;

$P$(Neglected)=PzSINeg1*PzLLNeg*PzLMNeg;

$P$(Controversial)=PzSIPos1*PzLLPos*PzLMPos;

$P$(Average)=PzSPAverage*PzSIAverage; and $P$(Unclassified)=(PzSINominal*PzSPNominal)−$P$(Average);

and further comprising:

calculating the total probabilities as

Total$P$=$P$(Popular)+$P$(Rejected)+$P$(Neglected)+$P$(Controversial)+$P$(Average)+$P$(Unclassified);

calculating the relative probability of each schoolchild's sociometric social classification upon re-assessment as:

$RP$(Popular)=[$P$(Popular)/Total$P$]*100;

$RP$(Rejected)=[$P$(Rejected)/Total$P$]*100;

$RP$(Neglected)=[$P$(Neglected)/Total$P$]*100;

$RP$(Controversial)=[$P$(Controversial)/Total$P$]*100;

$RP$(Average)=[$P$(Average)/Total$P$]*100; and $RP$(Unclassified)=[$P$(Unclassified)/Total$P$]*100; and calculating strength scores for each schoolchild and each sociometric social classification indicative of the degree to which the schoolchild's sociometric classification is likely to remain the same or change in future re-assessments as:

Highly Fixed if $RP$(classification)>75;

Fixed if 50<$RP$(classification)<75; and

Fluid if $RP$(classification)<50.

* * * * *